PORTABLE TELEVISION TUBE SUPPORT

Filed Feb. 3, 1958

INVENTOR.
SYDNEY TERMAN
BY Morris Spector
ATTY.

2,985,348

PORTABLE TELEVISION TUBE SUPPORT

Sydney Terman, 5643 W. North Ave., Chicago, Ill.

Filed Feb. 3, 1958, Ser. No. 712,752

5 Claims. (Cl. 224—5)

This invention relates to a cradle structure for facilitating the carrying of a television picture tube as an incident to the servicing of a television receiving set and for supporting such a tube after it has been removed from its chassis, or preparatory to placing it into its chassis.

The handling of a large cathode ray tube of a television set, more widely known as the picture tube, when it is outside the television chassis, requires care to avoid breakage. Due to the fragility and the awkward shape of the tube, accidental breakage of such tubes when they are outside of the television chassis, is a common occurrence. The probability of accidentally damaging the tube is very great if the tube is put in a position resting on its face and with the neck projecting upward. In such instances, due to the arcuate curvature of the face of the tube, it can be tipped over and damaged by a relatively minor jar or force, or, it may be easily scratched or marred by the supporting surface.

To place the tube in some other position involves other high probabilities of damaging the tube. Television picture tubes are particularly troublesome to carry as, for instance, to carry from the home to the service man's truck or vice versa. For example, when the tube is delivered to a home on a service call, or from the home back to the shop, the service man will generally carry the picture tube to and from his parked automobile truck on a separate trip from the trip when he is carrying the rest of his tools and equipment, to reduce the danger of damaging or breaking the tube. This requires an extra trip or two extra trips to the parked automobile, which is time consuming and therefore increases the cost of the service call.

It is an object of the present invention to provide a portable cradle for a television picture tube which is adapted to hold the tube securely in position.

It is a further object of the present invention to provide such a cradle on which the tube may be so supported that the cradle carrying the tube can be conveniently carried by the service man while permitting the service man to carry other objects such as, for instance, his tool kit.

It is a still further object of the present invention to provide a television supporting cradle which is simple and economical of construction and which may be used alone for supporting a tube in a static condition or in connection with a carrying strap for carrying a tube.

The attainment of the above and further objects of the present invention will be apparent from the following specification taken in conjunction with the accompanying drawing forming a part thereof.

In the drawing.

In the drawing, like reference numerals designate like parts throughout.

Figures 1, 2, 3, 4:
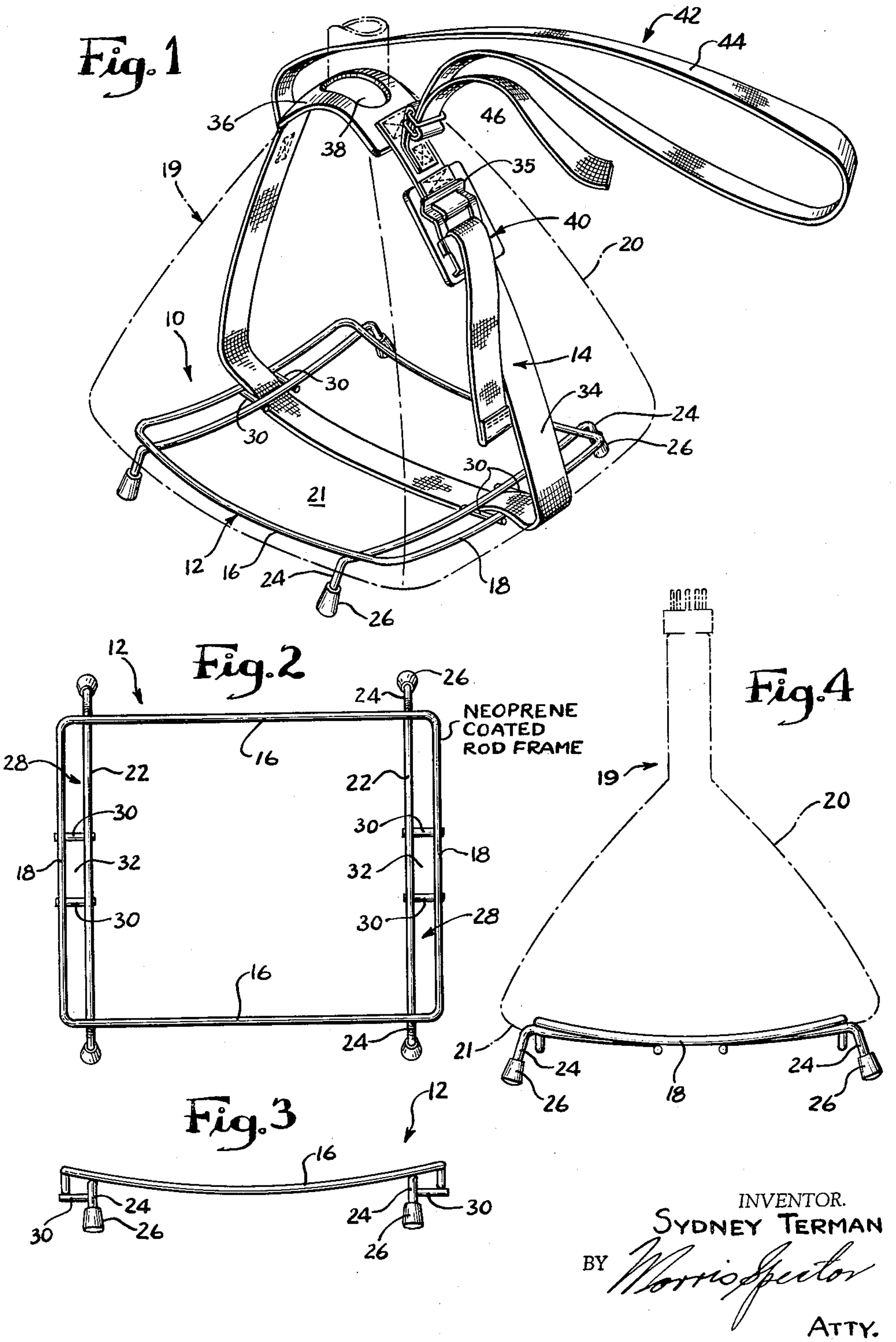
Figure 1 is a perspective view of a portable cradle embodying the present invention and showing how the picture tube is mounted on it.
Figure 2 is a plan view of the cradle stand with the mounting belt omitted.
Figure 3 is a front elevational view of the cradle stand.
Figure 4 is a side elevational view of the cradle stand with a television tube resting thereon.

A portable cradle of the present invention is indicated at 10. The cradle comprises a stand 12 that is adapted to be carried by a belt 14. In its broadest aspects the cradle stand may be made of any desired material to provide a base for the curved or picture viewing surface of a television tube, and to provide a hold for a strap whereby the tube may be held firmly against the cradle and the cradle with its tube carried. In its more specific embodiment, the cradle is formed of neoprene coated metal rod that is shaped to form a somewhat closed loop or polygon, in this instance, a square having one set of parallel sides 16—16 and another set of parallel sides 18—18. Each of the four sides 16 and 18 is curved in a vertical plane, being upwardly concave and designed to the shape of the curved face of a television tube, indicated at 19. Support rods 22, which are also metal rods coated with neoprene, underlie the sides 16—16 and are also upwardly concave in substantially the same manner as are the sides 18—18, and are located adjacent to but inwardly of the sides 18—18, which may be seen from Figure 2. These support rods are slightly below the sides 18—18 at the corners of the square and at substantially the same level as the sides 18—18 at their centers. The ends of the support rods 22 are bent downwardly to provide widely spaced feet 24, the ends of which may be footed with rubber cups or shoes 26. The feet space the rack sufficiently above the supporting surface so that a picture tube resting on the rack or cradle is definitely supported above and out of contact with the floor or other supporting surface. Because of the wide spacing of the supporting feet and their small height, there is little likelihood that the cradle or stand, with a television picture tube mounted thereon, may be knocked over.

The support rods 22 define the openings 28 adjacent diametrically opposite portions of the stand. These openings as seen in Fig. 2 are subdivided into three parts by a pair of parallel alignment rods 30. These alignment rods are perpendicular to the support rods 22 and to the ends 18 and are connected to them at points equidistant from their midpoints by any conventional means. They act to support and strengthen the cradle stand and define the belt receiving openings 32 which are centrally positioned between the sides 16.

As seen in Figure 1, the belt 14 includes a strap portion 34 and a conventional metallic buckle 35. The buckle is connected to the belt for tying the ends together and forming an adjustable loop. The belt further includes an enlarged substantially rectangular part 36, made from some soft flexible sheet material such as leather or rubber or a rubber like plastic. This part is provided with a circular opening 38 extending therethrough which is sized to receive the neck of a television picture tube.

To secure the television picture tube to the cradle stand, the strap portion 34 of the belt is inserted through the belt receiving openings 32, see Figure 1. Then the neck of the tube is passed through the neck receiving opening 38 in part 36. Finally, the ends of the strap portion 34 are tied together by means of the buckle 35 to form an adjustable loop. This loop is tightened until the strap portion 34 embraces the sides of the television picture tube, firmly holding it to the cradle stand 12. Since the buckle is made of metal, to prevent injury to the sides of the picture tube, a substantially rectangular sheet 40, made from soft flexible material is secured by any conventional means to the ends of the strap portion under the buckle 35. This prevents the buckle from contacting the sides of the picture tube and possibly damaging it, see Figure 1. As seen in Figure 4, the combined center of gravity of the television picture tube and the cradle stand will be very low, so that the television picture tube will be held in a position of stable equilibrium.

A carrying sling or belt, indicated generally at 42, includes a strap 44 and a conventional buckle 46, see Fig. 1. The ends of the strap 44 are secured to the ends of the rectangular portion 36 to form a loop. The buckle 46 is connected to the strap adjacent one of these ends and provides a means for adjusting the size of this loop. With this arrangement, the television picture tube can be conveniently carried by suspending the portable cradle from the loop of the sling 42, which may be passed over the shoulders of the carrier leaving his arms and hand free to carry other things.

In compliance with the requirements of the patent statutes, I have herein shown and described a preferred embodiment of the present invention. It is however to be understood that the invention is not limited to the precise construction here shown, the same being merely illustrative of the principles of the invention. What is considered new and sought to be covered by Letters Patent is:

1. An apparatus of the class described comprising in combination, a stand and a belt, said stand having an open cradle-forming frame portion shaped to conform to the curved face of a picture tube, said belt being connected to portions of the stand, a buckle connected to said belt for forming a loop and adjusting its size, said loop being adapted to embrace tightly the sides of a picture tube when the face of the picture tube is cradled in said frame portion, said belt having an opening therein adapted to receive the neck of the picture tube.

2. An apparatus of the class described comprising in combination a stand and a belt, said stand including a rod shaped to form a closed loop, said closed loop having parallel sides and ends, said sides and ends being arcuately curved in a vertical plane to provide an upwardly concave support which conforms to the curved face of a picture tube, support rods parallel to each end of said closed loop and connected to points on the sides, spaced parallel alignment rods connected to said support rods and to the adjacent ends of the closed loop to provide belt receiving openings at the ends of the closed loop centrally positioned between the sides, the ends of said support rods extending beyond the periphery of said closed loop and bent to form widely separated feet sized to hold the closed loop in a stable position in closely spaced relationship to a supporting surface, said belt extending through said belt receiving openings, a buckle connected to the ends of said belt for tying them together and forming an adjustable loop, said adjustable loop being adapted to embrace the sides of a picture tube resting on the stand, said belt having an opening therein sized to receive the neck of the picture tube.

3. An apparatus of the class described comprising in combination a stand and a belt, said stand including a rod shaped to form a closed loop, said closed loop having parallel sides and ends, said sides and ends arcuately curved in a vertical plane to provide a concave support which is adapted to conform to the curved face of a picture tube, support rods parallel to each end of said closed loop and connected to points on the sides thereof, the ends of said support rods extending beyond the periphery of said closed loop and bent to form widely separated feet to hold the closed loop in a stable position in closely spaced relation to a supporting surface, spaced parallel alignment rods connected to said support rods and the adjacent ends of the closed loop to provide centrally positioned belt receiving openings, said belt extending through said belt receiving openings, a buckle connected to the ends of said belt for tying them together and forming an adjustable loop adapted to embrace the sides of a picture tube resting on the stand, said belt including an enlarged flexible member, said member having a hole therein sized to receive the neck of a picture tube whereby it can be firmly secured to the stand, and a sling connected to the belt for conveniently transporting the picture tube secured to the stand.

4. A cradle stand for supporting a picture tube, said stand comprising a closed loop having parallel sides and ends, said sides and ends being arcuately curved in a vertical plane to provide an upwardly concave support which is adapted to conform to the curved face of a picture tube, support rods parallel to each end of said closed loop and connected to points on the sides thereof, the ends of said support rods extending beyond the periphery of said closed loop and bent to form widely spaced feet to hold the closed loop in a stable position in closely spaced relationship to a supporting surface, and spaced alignment rods connected between said support rods and the adjacent ends of the closed loop to provide diametrically opposed, centrally positioned belt receiving opening in the closed loop.

5. A cradle stand for supporting a picture tube, said stand comprising means forming a closed loop, said closed loop having parallel sides and ends, said sides and ends being arcuately curved in a vertical plane to provide an upwardly concave support which is adapted to conform to the curved face of a picture tube, support members parallel to each end of the closed loop and connected to points on the sides thereof, and the ends of said members extending beyond the periphery of said closed loop and projecting away from said closed loop to form widely spaced feet for holding the closed loop in a stable position in closely spaced relationship to a supporting surface.

References Cited in the file of this patent

UNITED STATES PATENTS

| | | |
|---|---|---|
| 946,850 | Tabler | Jan. 18, 1910 |
| 1,369,742 | Halpin | Feb. 22, 1921 |
| 1,481,418 | Darby | Jan. 22, 1924 |
| 1,639,563 | Hays | Aug. 16, 1927 |
| 2,530,227 | Cheek | Nov. 14, 1950 |
| 2,679,736 | Duchin | June 1, 1954 |

FOREIGN PATENTS

| | | |
|---|---|---|
| 14,652 of 1909 | Great Britain | June 22, 1909 |
| 584,609 | France | Nov. 22, 1924 |

UNITED STATES PATENT OFFICE

CERTIFICATE OF CORRECTION

Patent No. 2,985,348 May 23, 1961

Sydney Terman

It is hereby certified that error appears in the above numbered patent requiring correction and that the said Letters Patent should read as corrected below.

Column 4, line 34, for "opening" read -- openings --.

Signed and sealed this 17th day of October 1961.

(SEAL)
Attest:

ERNEST W. SWIDER
Attesting Officer

DAVID L. LADD
Commissioner of Patents

USCOMM-DC